United States Patent
Koral et al.

(10) Patent No.: US 8,907,599 B2
(45) Date of Patent: Dec. 9, 2014

(54) SIMPLIFIED ELECTRIC BRAKE DEVICE

(71) Applicant: Heidelberger Druckmaschinen AG, Heidelberg (DE)

(72) Inventors: Kubilay Koral, Wiesloch (DE); Michael Krueger, Edingen-Neckarhausen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 182 days.

(21) Appl. No.: 13/706,560

(22) Filed: Dec. 6, 2012

(65) Prior Publication Data

US 2013/0141022 A1 Jun. 6, 2013

(30) Foreign Application Priority Data

Dec. 6, 2011 (DE) .......................... 10 2011 120 183

(51) Int. Cl.
  *H02K 7/10* (2006.01)
  *H02P 3/26* (2006.01)
  *H02P 3/12* (2006.01)
  *H02P 3/16* (2006.01)
  *H02P 3/22* (2006.01)

(52) U.S. Cl.
  CPC .. *H02P 3/16* (2013.01); *H02P 3/26* (2013.01); *H02P 3/12* (2013.01); *H02P 3/22* (2013.01)
  USPC ............. 318/362; 318/87; 318/612; 318/759; 318/376; 188/24.14; 188/73.1

(58) Field of Classification Search
  CPC ....................................................... H02P 3/18
  USPC ........... 318/56, 57, 63, 86, 87, 134, 362, 376, 318/400.09, 612, 759; 188/34, 73.1; 180/244; 246/182 B; 251/129.13; 307/142
  See application file for complete search history.

(56) References Cited

U.S. PATENT DOCUMENTS

| | | | |
|---|---|---|---|
| 3,688,171 A * | 8/1972 | Salihi et al. | 318/759 |
| 4,426,606 A * | 1/1984 | Suita et al. | 318/375 |
| 5,327,055 A * | 7/1994 | Danielson et al. | 318/366 |
| 6,919,705 B2 | 7/2005 | Donat | |
| 6,938,555 B2 | 9/2005 | Joeckel et al. | |
| 7,368,889 B2 * | 5/2008 | Youm et al. | 318/801 |
| 8,026,681 B2 | 9/2011 | Alexander et al. | |

FOREIGN PATENT DOCUMENTS

| | | |
|---|---|---|
| DE | 101 46 896 A1 | 5/2003 |
| DE | 101 60 612 A1 | 6/2003 |
| DE | 10 2007 058 098 A1 | 6/2008 |
| JP | 2009022060 A | 1/2009 |

OTHER PUBLICATIONS

German Patent and Trademark Office Search Report, Dated Sep. 6, 2012.

* cited by examiner

*Primary Examiner* — Antony M Paul
(74) *Attorney, Agent, or Firm* — Laurence A. Greenberg; Werner H. Stemer; Ralph E. Locher

(57) ABSTRACT

An electric brake device is provided for electronically controlled synchronous motors which are supplied with voltage by way of a converter. The synchronous motor contains a winding center point and that the winding center point is connected by way of an electric resistor and a switch to a ground point of the converter and that the phases of the converter that are connected to the ground point contain in each case a free-wheeling diode.

10 Claims, 2 Drawing Sheets

SIMPLIFIED ELECTRIC BRAKE DEVICE

CROSS-REFERENCE TO RELATED APPLICATION

This application claims the priority, under 35 U.S.C. §119, of German application DE 10 2011 120 183.5, filed Dec. 6, 2011; the prior application is herewith incorporated by reference in its entirety.

BACKGROUND OF THE INVENTION

Field of the Invention

The present invention relates to an electric brake device for electronically controlled synchronous motors that are supplied with voltage by way of a converter.

Synchronous motors controlled in this manner are above all used as traction drives in electrically driven vehicles, such as trams, but also as drives in large machines, such as printing machines. In this case, the electronically controlled synchronous motors are for the most part supplied with voltage by way of a bi-directional converter, so that the synchronous motor not only uses electrical energy; on the contrary, for example during the braking action, it can also generate electrical energy. In this manner, the synchronous motor can be used in the regenerative operation as a brake and in addition it feeds electrical energy back into the electric supply network which saves energy and reduces costs. The use of a permanently energized synchronous motor is, for example, known from published, non-prosecuted German application DE 101 60 612 A1, corresponding to U.S. Pat. No. 6,938,555, in which this motor is used as a traction drive in a rail-born vehicle. The synchronous motor is also supplied in this case with voltage by way of a current converter in the traction operation. An electric brake device is provided that contains for each phase brake resistors that are separate and connected in a star-shaped manner, wherein the brake resistors for each of the three phrases can be connected to the synchronous motor in each case by way of a switch. In this manner, an electric brake is achieved for a rail-born vehicle.

In the case of printing machines, it is necessary for safety reasons to provide a second brake device that can decelerate the electric drive motor independently from a first brake. A redundant electric brake device of this type for printing machines is known from the U.S. Pat. No. 8,026,681 B2. In the case of this redundant electric brake device, a switchable electric brake device is arranged between the drive motor of the printing machine and the alternating-current converter for controlling the motor, which brake device renders possible a safe and reliable regenerative braking action in a controlled manner by way of a computer even in the event of a failure of the electric supply network. The electric brake device contains an electric brake resistor and a rectifier that rectifies the motor voltage for the brake resistor. The additional electric brake can control the braking action by way of the rectifier. In addition, after the electric drive has been decelerated, the motor can be held in the position by a mechanical brake.

The solutions in the prior art have the disadvantage that an additional rectifier or a plurality of switches and corresponding cooling bodies, housings etc. are necessary for the brake circuit in order to ensure the required redundancy in the event of a failure of the primary brake device. In addition, an additional monitoring circuit is for the most part required, which monitoring circuit can contain a current monitoring circuit of the additional bridge section. These additional components require installation space and lead to higher costs for the drive.

SUMMARY OF THE INVENTION

It is accordingly an object of the invention to provide an electric brake device for an electronically controlled synchronous motor which overcome the above-mentioned disadvantages of the prior art methods and devices of this general type, which on the one hand ensures the required redundancy and on the other hand requires the fewest possible additional electric components.

With the foregoing and other objects in view there is provided, in accordance with the invention an electric brake device for electronically controlled synchronous motors. The electric brake device contains an electric resistor, a switch and a converter supplying voltage to a synchronous motor. The converter has a ground point and phases each containing a free-wheeling diode and connected to the ground point. The synchronous motor has a winding center point connected by way of the electric resistor and the switch to the ground point of the converter.

The electric brake device in accordance with the invention is suitable for a redundant electric braking action in the event of a failure of the converter in machines and vehicles that are driven by synchronous motors. In this case, the synchronous motor is supplied by way of a converter that converts the direct current voltage of a direct current voltage intermediate circuit into the motor voltage. The direct current voltage of the direct current voltage intermediate circuit is provided by a rectifier that is connected on the electric supply network side. During normal operation, the synchronous motor in this case is decelerated by way of the converter, in that the converter is controlled in such a manner that the synchronous motor runs in the regenerative operation and during the braking action generates current that it either feeds back into the network or dissipates it in a brake resistor. In accordance with the present invention it is now provided that the windings of the synchronous motor that are connected in a star-shaped manner are routed together in a winding center point and that the winding center point is connected to the ground point of the converter by way of an electric resistor and a switch. In addition, the phases of the converter that are connected to the ground point contain in each case a free-wheeling diode which carries the current during the braking action. In this manner, even in the event of a failure of the converter, the current circuit can be connected by way of the free-wheeling diodes, the synchronous motor, the electric resistor and the then connected switch. During the normal operation, the switch remains open so that no current can flow by way of the electric resistor. The switch can be a relay, however, it is preferably embodied as a semiconductor element, such as an IGBT or thyristor, that is also able to carry high currents.

It is provided in a first embodiment of the invention that the electric resistor contains a current line. This represents a particularly cost-effective solution since, in this case, it is not necessary to install a further electric resistor in addition to the already available current line. Since the line contains a given length, the heat during the braking action can be easily discharged by way of the line. However, since the electric resistor of a current line is if anything comparatively small, it is not possible in this manner to achieve a rapid braking action, for which reason the provision of a current line is not sufficient in most cases.

It is provided in a further embodiment of the invention that the electric resistor is integrated in the motor. In this case, the electric resistor can be accommodated directly in the motor housing so that it is only necessary to provide externally on the housing a connection for the electric resistor on the switch to the ground point of the converter. The electric resistor can also be divided into a plurality of resistors in order to be able to better carry away the heat.

It is advantageously provided that the converter contains a bridge circuit having a first and a second bridge half. Within the meaning of the present invention, the first three switches are understood to be the first bridge half, also described as the upper bridge half, and the second three switches are understood to be the second bridge half, also described as the lower bridge half. In this case, the two halves of the bridge circuit can then be used to control the braking action. During the operation of the electric brake device the current flows by way of the second bridge half, which is connected to the ground point of the converter, so that the brake device must be switched on during the braking operation. The first bridge half that is not connected to the ground point of the converter is used for switching off the connection between the converter and the direct current voltage intermediate circuit, so that by switching off the first bridge half the drive motor can be separated from the direct current intermediate circuit that is supplying the converter.

In addition, it is advantageously provided that in the phases for supplying the motor with electrical voltage current transformers are arranged for checking the functionality. These current transformers can be used to check whether the converter is functioning correctly and simultaneously these current transformers can be used in order to monitor the braking action.

In addition, it is advantageously provided that the converter is a bi-directional alternating current converter. In the case of this embodiment, it is possible to feedback electrical energy that is generated by the synchronous motor during a normal regenerative braking action by way of the bi-directional alternating current converter to the direct current voltage intermediate circuit and by way of a second bi-directional alternating current converter also to the electric supply network. This is used to save electrical energy, in that electrical energy generated during the braking action is not simply converted into heat but is fed back into the electric supply network.

In addition, it is provided that additionally a mechanically functioning holding brake is provided for holding the motor. The holding brake can be dimensioned in an extremely small and compact manner since it is no longer necessary to decelerate the motor; on the contrary it is used exclusively to mechanically hold the motor after deceleration, so that the motor cannot further rotate unintentionally. A mechanical holding brake of this type is by far more cost-effective than a dynamic mechanical brake that must also be embodied for the purpose of decelerating the electric drive from high rotational speeds.

Other features which are considered as characteristic for the invention are set forth in the appended claims.

Although the invention is illustrated and described herein as embodied in a simplified electric brake device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
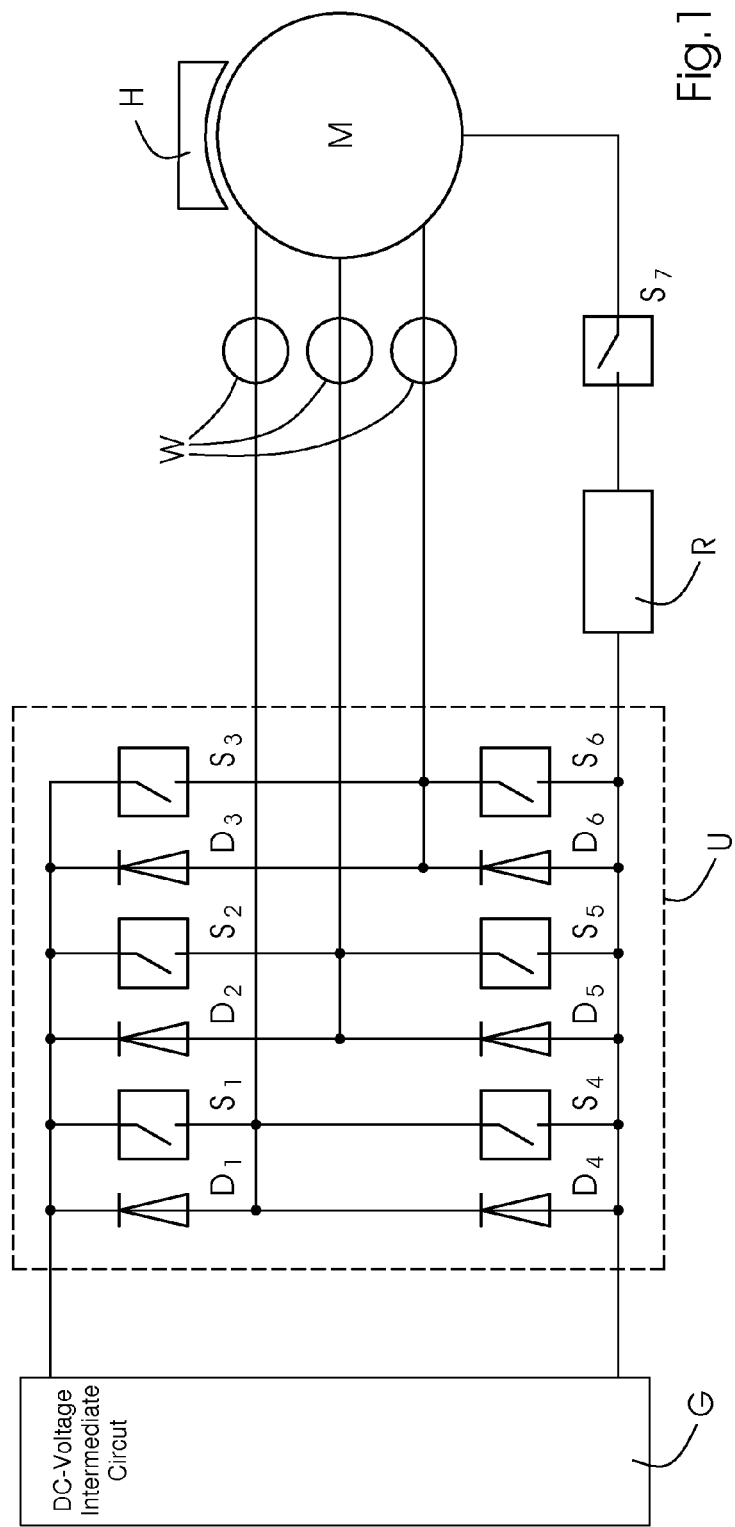
FIG. 1 is a block diagram showing a first variant having additional electrical braking resistance according to the invention.

Referring now to the figures of the drawing in detail and first, particularly, to FIG. 1 thereof, there is shown an electronic control of a synchronous drive M as is also used in printing machines. In this case, the synchronous drive M is supplied with the required rotor voltage by way of a three-phase connection from a converter U. The converter U contains two bridge sections, a first upper bridge section having three transistors $S_1$, $S_2$, $S_3$ and a second lower bridge section having likewise three transistors $S_4$, $S_5$, $S_6$. In each case, free-wheeling diodes $D_1$, $D_2$, $D_3$, $D_4$, $D_5$, $D_6$ are connected in parallel with transistors $S_1$, $S_2$, $S_4$, $S_5$, $S_6$ in both bridge sections. The free-wheeling diodes $D_1$, $D_4$, $D_5$, $D_6$ are components of the converter U and when using insulated gate bipolar transistors (IGBTs) as the switches $S_1$, $S_2$, $S_3$ $S_4$, $S_5$, $S_6$, the diodes are integrated in the IGBTs. The free-wheeling diodes $D_1$, $D_2$, $D_3$, $D_4$, $D_5$, $D_6$ that are already provided in the bridge circuit are required during the normal operation of the converter U so that it is not necessary to provide additional diodes for the electric brake device. The free-wheeling diodes $D_1$, $D_2$, $D_3$, $D_4$, $D_5$, $D_6$ are now also used additionally for the purpose of carrying the regenerative current of the drive motor M when using a electric brake device and in the event of a failure of the converter U.

The converter U is connected to a direct current voltage intermediate circuit C that in turn is connected in a form, not illustrated in this case, by way of a rectifier to the electric supply network. In addition, three current transformers W are integrated in the three phases for supplying the voltage of the motor M, which current transformers sense the current and are used to monitor the functionality of the converter U.

If the converter U fails and the upper switches $S_1$, $S_2$, $S_3$ are no longer connected, then by the open switches $S_1$, $S_2$, $S_3$ the lower half of the converter U can be disconnected from the direct current voltage intermediate circuit G, and the additional switch $S_7$ that can be embodied as the other switches $S_1$ to $S_6$ as an IGBT is dosed in order in this manner to dose the brake-current circuit. For this purpose, the switch $S_7$ is connected to the winding center point S of the motor M and on the other side to a brake resistor R. The current circuit is then dosed by way of the diodes $D_4$, $D_5$, $D_6$ of the second bridge half and the rotational energy available in the motor M is decelerated by regenerative braking in which the energy in the brake resistor R is converted into heat. After the motor M has been decelerated to a stop, a mechanical holding brake H is dosed in order to prevent the motor M from rotating.

Figure 2:
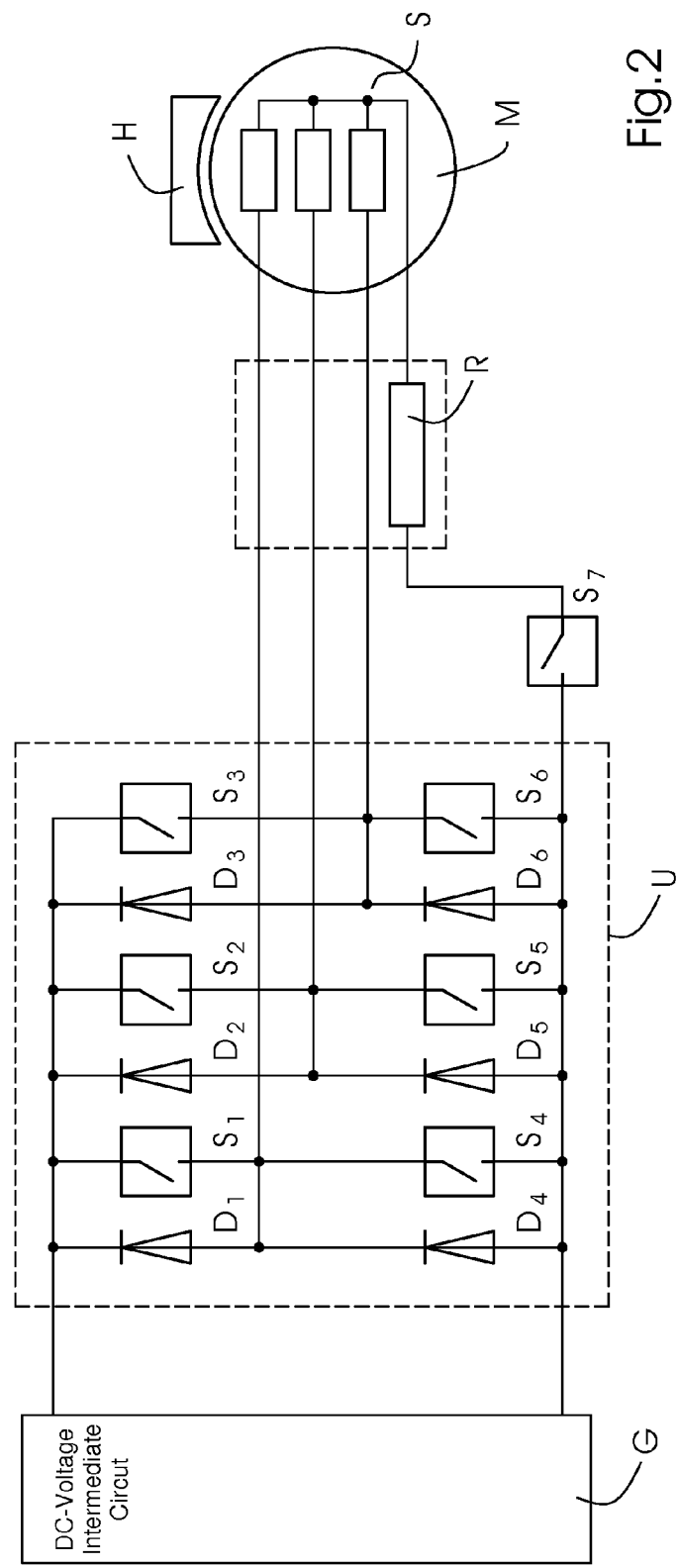
FIG. 2 is a block diagram showing a second variant in which the electrical braking resistance contains a current line.

In the case of the variant in FIG. 2, no additional resistor R is provided; on the contrary, the resistance of the current line between the winding center point S and the switch $S_7$ is used as the brake resistor R. If the line between the switch $S_7$ and the winding center point S is sufficiently long, then the heat can be discharged uniformly and a short braking action does not lead to any overloading of the current line. The mechanical holding brake H is also closed in this case after the deceleration of the motor M in order to prevent the motor from rotating.

In the case of the two variants in FIGS. 1 and 2, it is therefore possible in the event of a failure of the converter U by closing the switch $S_7$ to direct a regenerative braking action into the lines without requiring many additional electric components as are required in the prior art.

LIST OF REFERENCE NUMERALS

M Motor
G Direct current voltage intermediate circuit
R Resistor
$S_1, S_2, S_3, S_4, S_5, S_6, S_7$ Switch
$D_1, D_2, D_3, D_4, D_5, D_6$ Free-wheeling diode
S Winding center point
W Current transformer
U Converter
H Mechanical holding brake

The invention claimed is:

1. An electric brake device for electronically controlled synchronous motors, the electric brake device comprising:
    an electric resistor;
    a switch; and
    a converter supplying voltage to a synchronous motor, said converter having a ground point and phases each containing a free-wheeling diode and connected to said ground point, the synchronous motor having a winding center point connected by way of said electric resistor and said switch to said ground point of said converter.

2. The electric brake device according to claim 1, wherein said electric resistor is a current line.

3. The electric brake device according to claim 1, wherein said electric resistor is integrated in the synchronous motor.

4. The electric brake device according to claim 1, wherein said converter contains a bridge circuit having a first bridge half and a second bridge half that is connected to said ground point of said converter.

5. The electric brake device according to claim 4, wherein said second bridge half of said converter is connected during operation of the electric brake device.

6. The electric brake device according to claim 4, wherein by means of switching off said first bridge half the electric brake device and the synchronous motor are disconnected from a direct current voltage intermediate circuit that supplies said converter.

7. The electric brake device according to claim 1, further comprising current transformers, said phases for supplying the synchronous motor with the voltage are connected to said current transformers for checking a functionality of said converter.

8. The electric brake device according to claim 1, wherein said converter is a bi-directional alternating current converter.

9. The electric brake device according to claim 1, further comprising a mechanically functioning holding brake for holding the synchronous motor.

10. The electric brake device according to claim 1, wherein said converter has further switches being insulated gate bipolar transistor (IGBT) switches.

* * * * *